US010825146B2

(12) United States Patent
Ouyang et al.

(10) Patent No.: US 10,825,146 B2
(45) Date of Patent: Nov. 3, 2020

(54) METHOD AND DEVICE FOR IMAGE PROCESSING

(71) Applicant: GUANGDONG OPPO MOBILE TELECOMMUNICATIONS CORP., LTD., Guangdong (CN)

(72) Inventors: Dan Ouyang, Dongguan (CN); Guohui Tan, Dongguan (CN)

(73) Assignee: GUANGDONG OPPO MOBILE TELECOMMUNICATIONS CORP., LTD, Guangdong (CN)

(*) Notice: Subject to any disclaimer, the term of this patent is extended or adjusted under 35 U.S.C. 154(b) by 136 days.

(21) Appl. No.: 16/163,370

(22) Filed: Oct. 17, 2018

(65) Prior Publication Data

US 2019/0164256 A1 May 30, 2019

(30) Foreign Application Priority Data

Nov. 30, 2017 (CN) .......................... 2017 1 1243997

(51) Int. Cl.
*G06T 5/00* (2006.01)
*G06T 5/50* (2006.01)
*G06T 7/55* (2017.01)
*H04N 13/25* (2018.01)
*H04N 5/232* (2006.01)
(Continued)

(52) U.S. Cl.
CPC ................ *G06T 5/002* (2013.01); *G06T 5/50* (2013.01); *G06T 7/55* (2017.01); *H04N 5/2173* (2013.01); *H04N 5/2226* (2013.01); *H04N 5/2258* (2013.01); *H04N 5/23229* (2013.01); *H04N 13/25* (2018.05)

(58) Field of Classification Search
CPC .. G06T 5/002; G06T 7/55; G06T 5/50; H04N 13/25; H04N 5/2173; H04N 5/2226; H04N 5/2258; H04N 5/23229
See application file for complete search history.

(56) References Cited

U.S. PATENT DOCUMENTS 8,717,449 B2  5/2014  Yahata
9,143,749 B2  9/2015  Wernersson
(Continued)

FOREIGN PATENT DOCUMENTS

CN  103108122 A  5/2013
CN  104065854 A  9/2014
(Continued)

OTHER PUBLICATIONS

Google Scholar Search Results.*
(Continued)

*Primary Examiner* — Qun Shen
(74) *Attorney, Agent, or Firm* — Ladas & Parry, LLP

(57) ABSTRACT

A method for image processing includes the following actions. After n frames of first images shot by a main camera are acquired and an auxiliary image shot by an auxiliary camera is acquired, synthetic noise reduction is performed on the n frames of first images to obtain a frame of main image. Depth information of the main image is further calculated according to the main image and the auxiliary image. Therefore, blurring processing is performed on the main image according to the depth information of the main image to obtain a required second image.

16 Claims, 5 Drawing Sheets

(51) Int. Cl.
 H04N 5/225 (2006.01)
 H04N 5/222 (2006.01)
 H04N 5/217 (2011.01)

(56) References Cited

U.S. PATENT DOCUMENTS

| | | | | |
|---|---|---|---|---|
| 9,386,230 | B1* | 7/2016 | Duran | H04N 5/2254 |
| 9,681,058 | B2* | 6/2017 | Wang | H04N 9/04 |
| 2013/0120616 | A1* | 5/2013 | Yahata | H04N 5/23293 |
| | | | | 348/239 |
| 2013/0147843 | A1* | 6/2013 | Shimizu | H04N 19/85 |
| | | | | 345/647 |
| 2014/0232900 | A1 | 8/2014 | Wernersson | |
| 2014/0285672 | A1* | 9/2014 | Hogasten | H04N 7/181 |
| | | | | 348/164 |
| 2015/0062370 | A1 | 3/2015 | Shroff et al. | |
| 2015/0097981 | A1* | 4/2015 | Griffith | G06T 5/50 |
| | | | | 348/218.1 |
| 2017/0007459 | A1* | 1/2017 | Deng | H04N 5/2351 |
| 2017/0019616 | A1* | 1/2017 | Zhu | G06T 5/002 |
| 2018/0012335 | A1* | 1/2018 | Adsumilli | H04N 5/23238 |
| 2018/0129262 | A1* | 5/2018 | Veiga | G06F 3/012 |
| 2018/0139369 | A1* | 5/2018 | Chen | H04N 5/232127 |
| 2018/0227478 | A1* | 8/2018 | Li | H04N 5/2258 |
| 2020/0029026 | A1* | 1/2020 | Li | H04M 1/725 |

FOREIGN PATENT DOCUMENTS

| | | |
|---|---|---|
| CN | 104253939 A | 12/2014 |
| CN | 104333700 A | 2/2015 |
| CN | 105100615 A | 11/2015 |
| CN | 105556935 A | 5/2016 |
| CN | 105763813 A | 7/2016 |
| CN | 106550184 A | 3/2017 |
| CN | 106791341 A | 5/2017 |
| CN | 107220951 A | 9/2017 |
| CN | 107948520 A | 4/2018 |

OTHER PUBLICATIONS

Hou, Honghua; Image fusion; The digital image processing and analysis; mailed on Sep. 30, 2011; p. 233-238.
Second Office Action from CN app. No. 201711243997.3, dated Aug. 19, 2019, with machine English translation.
First Office Action from CN app. No. 201711243997.3, dated May 23, 2019, with machine English translation.
Notice of Rejection from CN app. No. 201711243997.3, dated Dec. 30, 2019, with machine English translation.
Supplementary European Search Report in the European application No. 18204938.7, dated May 16, 2019.
International search report in international application No. PCT/CN2018/114920, dated Jan. 24, 2019.
English translation of the written opinion of the international search authority in international application No. PCT/CN2018/114920, dated Jan. 24, 2019.

* cited by examiner

METHOD AND DEVICE FOR IMAGE PROCESSING

CROSS-REFERENCE TO RELATED APPLICATION

The present application claims benefit of Chinese Patent Application 201711243997.3, filed on Nov. 30, 2017, the contents of which are hereby incorporated by reference in its entirety.

TECHNICAL FIELD

The present disclosure relates to the technical field of mobile terminals, and particularly to a method and device for image processing.

BACKGROUND

In a related art, for implementing background blurring processing over an image, double cameras may be adopted to acquire two photos respectively. One of the two photos is determined as an imaged photo, depth information of the imaged photo is calculated according to the other photo, and blurring processing is accordingly performed on a background of the imaged photo.

However, when such a manner in the conventional art is adopted in a dark 25 environment, an imaging effect of the imaged photo is poor, and in addition, the depth information is not so accurate, so that an effect of the image subjected to blurring processing is relatively poor.

SUMMARY

According to a first aspect, a method for image processing is disclosed. The method may include the following actions.

n frames of first images shot by a main camera are acquired. An auxiliary image is acquired by an auxiliary camera, where n may be a natural number more than or equal to 2. The n frames of first images may include a frame of basic frame image and the auxiliary image shot by the auxiliary camera and the basic frame image shot by the main camera may be synchronously shot.

Synthetic noise reduction is performed on the n frames of first images to obtain a frame of main image.

A formed image is generated according to the main image;

Depth information of the formed image is calculated according to the auxiliary image.

Blurring processing is performed on the formed image according to the depth information of the formed image to obtain a required second image.

According to a second aspect, a device for image processing is disclosed. The device may include a processor and a memory storing instructions. The instructions, when executed by the processor, cause the processor to perform the method according to the first aspect.

According to a third aspect, a non-transitory computer-readable storage medium is disclosed, where a program may be executed by a processor to implement the method for image processing according to the first aspect.

BRIEF DESCRIPTION OF DRAWINGS

The abovementioned and/or additional aspects and advantages of the disclosure will become apparent and easy to understand from the descriptions made to the embodiments below in combination with the drawings.

DETAILED DESCRIPTION

Figure 1:
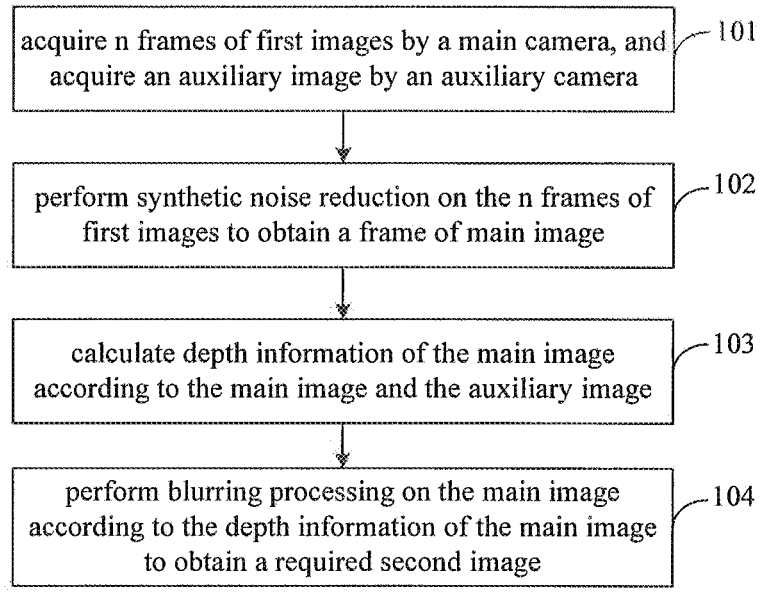
FIG. 1 illustrates a flowchart of a double-camera-based imaging method according to an embodiment of the disclosure.

The embodiments of the disclosure will be described below in detail.

Examples of the embodiments are illustrated in the drawings and the same or similar reference signs always represent the same or similar components or components with the same or similar functions. The embodiments described below with reference to the drawings are exemplary and intended to explain the disclosure and should not be understood as limits to the disclosure.

A method and device for image processing of the embodiments of the disclosure will be described below with reference to the drawings.

The method for image processing may be executed by a hardware device with double cameras, for example, a mobile phone, a tablet computer, a personal digital assistant and a wearable device. The hardware device with the double cameras includes a shooting module. The shooting module includes a main camera and an auxiliary camera. Each of the main camera and the auxiliary camera is provided with a lens, image sensor and voice coil motor which are independent respectively. Both of the main camera and auxiliary camera in the double cameras are connected with a camera connector, so that the voice coil motors are driven according to a current value provided by the camera connector, and the main camera and the auxiliary camera are driven by the voice coil motors to regulate distances between the lenses and the image sensors to implement focusing.

As a possible application scenario, a resolution of the auxiliary camera is lower than a resolution of the main camera. During focusing, only the auxiliary camera is adopted for focusing. During sharp focusing of the auxiliary camera, a second driving current value of the motor of the auxiliary camera is acquired, a first driving current value of the motor of the main camera is further determined according to the second driving current value when the main camera and the auxiliary camera have the same sharp focusing distance, and the first driving current value is adopted to drive the main camera for focusing. Since the auxiliary camera is relatively low in resolution and relatively high in image processing speed, a focusing speed may be increased, and the technical problem of relatively low focusing speed of double cameras in the conventional art is solved.

In a specific implementation process of the double cameras, different cameras may be selected and combined as the main camera and auxiliary camera in the double cameras, thereby meeting different user requirements.

In an application scenario, a relatively high focusing speed is required. Then, the main camera in the double cameras is specifically an ordinary camera and the auxiliary camera in the double cameras is specifically a Dual Pixel (PD) camera. The resolution of the PD camera is lower than the ordinary camera. Therefore, a higher focusing speed is achieved.

It is to be noted that each pixel of the PD camera consists of two units. The two units may be taken as phase focusing detection points and may also be combined into a pixel for imaging. Therefore, focusing performance during electronic view finding is greatly improved. A PD Complementary Metal Oxide Semiconductor (CMOS) sensor camera is a common PD camera specifically adopting a CMOS as a sensor, and is originally adopted for a single lens reflex camera.

In another application scenario, a relatively good imaging effect is required. Then, a wide-angle camera and a telephoto camera are combined into the double cameras. The main and auxiliary cameras are switched according to a shooting requirement. Specifically, when a close shot is taken, the wide-angle camera is used as the main camera and the telephoto camera is used as the auxiliary camera. When a long shot is taken, the telephoto camera is used as the main camera and the wide-angle camera is used as the auxiliary camera. Therefore, not only is an optical zooming function realized, but also imaging quality and a subsequent blurring effect are ensured.

Many other possible implementation manners may also be adopted for specific selection of the double cameras and will not be elaborated in the embodiments.

FIG. 1 illustrates is a flowchart of a method for image processing according to an embodiment of the disclosure.

As illustrated in FIG. 1, the method for image processing includes the following actions.

In 101, n frames of first images are acquired by a main camera, and an auxiliary image is acquired by an auxiliary camera.

Where n is a natural number more than or equal to 2, the n frames of first images include a frame of basic frame image, and the auxiliary image shot by the auxiliary camera and the basic frame image shot by the main camera are synchronously shot.

In the embodiment, the main camera and auxiliary camera in double cameras may be determined in advance according to ambient luminance.

Specifically, when the high-resolution camera is adopted for photographing as the main camera in case of insufficient light when the ambient luminance is not higher than threshold luminance, more noise may be produced to cause a poor imaging effect. Therefore, in the embodiment, in case of sufficient light, photos may be taken by adopting the high-ISO camera as the main camera and adopting the high-resolution camera as the auxiliary camera to reduce noise in the images and improve the imaging effect. On the contrary, when there is sufficient light when the ambient luminance is higher than the threshold luminance, a resolution of the high-resolution camera is relatively high, and a relatively sharp image may be formed with less noise, so that the photos may be taken by adopting the high-resolution camera as the main camera and adopting the high-ISO camera as the auxiliary camera in the embodiment to improve the imaging effect.

After the main camera and the auxiliary camera determined, the main camera and the auxiliary camera may simultaneously be adopted to continuously find views and shoot to obtain multiple frames of images shot by the main camera and the auxiliary camera respectively, and then n frames of shot images which are continuously shot may be selected from the multiple frames of shot images shot by the main camera as the n frames of first images. For example, n frames of images which are continuously shot may be randomly selected as the n frames of first images, or, n frames of shot images of which an average resolution is highest and which are continuously shot may be selected as the n frames of first images. There are no limits made thereto.

After the n frames of first images are obtained, a basic frame image in the n frames of first images may be determined. As a possible implementation mode, for improving the imaging effect, the shot image with a highest resolution in the n frames of first images may be determined as the basic frame image, and then a frame of shot image which is shot synchronously with the basic frame image shot by the main camera is selected from the multiple frames of shot images shot by the auxiliary camera as the auxiliary image. Since the auxiliary image shot by the auxiliary camera and the high-resolution basic frame image shot by the main camera are synchronously shot, when a field depth is calculated under assistance of the corresponding auxiliary image, depth information calculation accuracy may be improved.

In 102, synthetic noise reduction is performed on the n frames of first images to obtain a frame of main image.

In the embodiment, a noise reduction algorithm may be adopted to perform synthetic noise reduction on the n frames of first images to obtain the frame of main image. Here, the noise reduction algorithm may be a non local means noise reduction algorithm and may also be another noise reduction algorithm, which will not be limited in the embodiment.

For conveniently and clearly understanding a multi-frame integrated noise reduction process, multi-frame integrated noise reduction will be briefly introduced below.

When ambient light is insufficient, imaging equipment such as a mobile terminal usually adopts a manner of automatically improving ISO. However, such a manner for improving the ISO results in more noise in an image. Multi-frame integrated noise reduction is intended to reduce noise points in the image and improve quality of the image shot in a high-ISO condition. A principle is priori knowledge that noise points are arranged in a random order. Specifically, after multiple frames of shot images are continuously shot, a noise point appearing at the same position may be a red noise point and may also be a green noise point and a white noise point and even there is no noise point, so that there is a comparison and screening condition, and pixels which are noise (i.e., noise points) may be screened according to a value of each pixel corresponding to the same position in the multiple frames of shot images. Furthermore, after the noise points are screened, color guessing and pixel replacement processing may further be performed on the noise points according to a further algorithm to achieve a noise point removal effect. By such a process, an effect of reducing noise with extremely low image quality loss degree may be achieved.

For example, as a relatively convenient multi-frame integrated noise reduction method, after multiple frames of shot images are acquired, a value of each pixel corresponding to the same position in the multiple frames of shot images may be read and a weighted average of these pixels is calculated to generate a value of the pixel at the position in a composite image. In such a manner, a sharp image may be obtained.

The multiple frames of shot images include a frame of sharpest image and it may be determined as a basic frame. For the basic frame, as a possible implementation mode, a weight of the basic frame may be higher than weights of the other shot images. That is, a function of recognizing and removing noise points in the basic frame with the other shot images as references is substantially realized.

In 103, depth information of the main image is calculated according to the main image and the auxiliary image.

Specifically, since there is a certain distance between the main and auxiliary cameras, which results in a disparity of the two cameras, images shot by different cameras should be different. The main image is obtained by synthetic noise reduction over the images shot by the main camera, and the auxiliary image is shot by the auxiliary camera, so that there may also be a certain difference between the main image and the auxiliary image. According to a triangulation ranging principle, depth information of the same object in the main image and the auxiliary image, i.e., a distance between the object and a plane where the main and auxiliary cameras are located, may be calculated.

For clearly describing the process, the triangulation ranging principle will be briefly introduced below.

Figure 2:
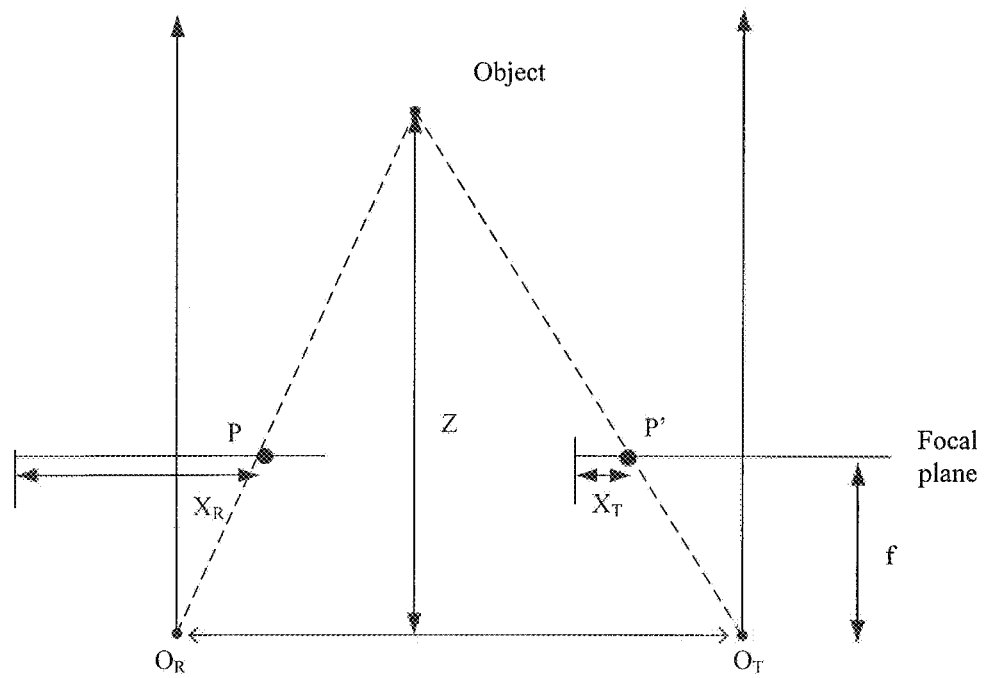
FIG. 2 illustrates a schematic diagram of a triangulation ranging principle.

In a practical scenario, a depth of a photographic field is mainly resolved by binocular vision when being resolved by eyes. This is the same as a principle of resolving the depth by double cameras. In the embodiment, a main method for calculating the depth information of the formed image according to the second shot image is the triangulation ranging principle. FIG. 2 is a schematic diagram of the triangulation ranging principle.

In FIG. 2, an imaging object, positions $O_R$ and $O_T$ of the two cameras and a focal plane of the two cameras are drawn in a practical space, a distance between the focal plane and the plane where the two cameras are located is f, and the two cameras perform imaging at a position of the focal plane, thereby obtaining two shot images.

P and P are positions of the same object in different shot images respectively, wherein a distance between P and a left-side boundary of the corresponding shot image is $X_R$, and a distance between P and a left-side boundary of the corresponding shot image is $X_T$. $O_R$ and $O_T$ are the two cameras respectively, and the two cameras are located in the same plane at a distance B.

On the basis of the triangulation ranging principle, there exists the following relationship for the distance Z between the object and plane where the two cameras are located in FIG. 2:

$$\frac{B}{Z} = \frac{(B + X_T) - X_R}{Z - f}.$$

On such a basis, $$Z = \frac{B \cdot f}{X_R - X_T} = \frac{B \cdot f}{d}.$$

may be calculated, wherein d is a distance difference between the positions of the same object in different shot images. Since B and f are fixed values, the distance Z of the object may be determined according to d.

In 104, blurring processing is performed on the main image according to the depth information of the main image to obtain a required second image.

Specifically, after the depth information of the main image is calculated, whether an object is a foreground or a background may be determined according to depth information of the object in the main image. In general, when the depth information indicates that the object is relatively close to the plane where the main and auxiliary cameras are located and a depth value is relatively small, it may be determined that the object is a foreground, otherwise the object is a background.

Blurring processing may be performed on the recognized background to obtain the required second image. In the second image, the foreground is more highlighted, the background is blurred, and a foreground-focused imaging effect is achieved.

According to the double-camera-based imaging method of the embodiment, after the n frames of first images shot by the main camera are acquired and the auxiliary image shot by the auxiliary camera is acquired, synthetic noise reduction is performed on the n frames of first images to obtain the frame of main image, and the depth information of the main image is further calculated according to the main image and the auxiliary image, thereby performing blurring processing on the main image according to the depth information of the main image to obtain the required second image. Synthetic noise reduction is performed on the n frames of first images to obtain the frame of main image, so that noise in the image is reduced, and a resolution of the main image is relatively high. In addition, the auxiliary image shot by the auxiliary camera and the basic frame image shot by the main camera are synchronously shot, so that performing subsequent blurring processing on the high-resolution main image according to the corresponding auxiliary image improves an imaging effect of an imaged photo on one hand and, on the other hand, improves accuracy of the depth information to further achieve a relatively good image processing effect and solve the technical problem of relatively poor effect of the image subjected to blurring processing in the conventional art.

Figure 3:
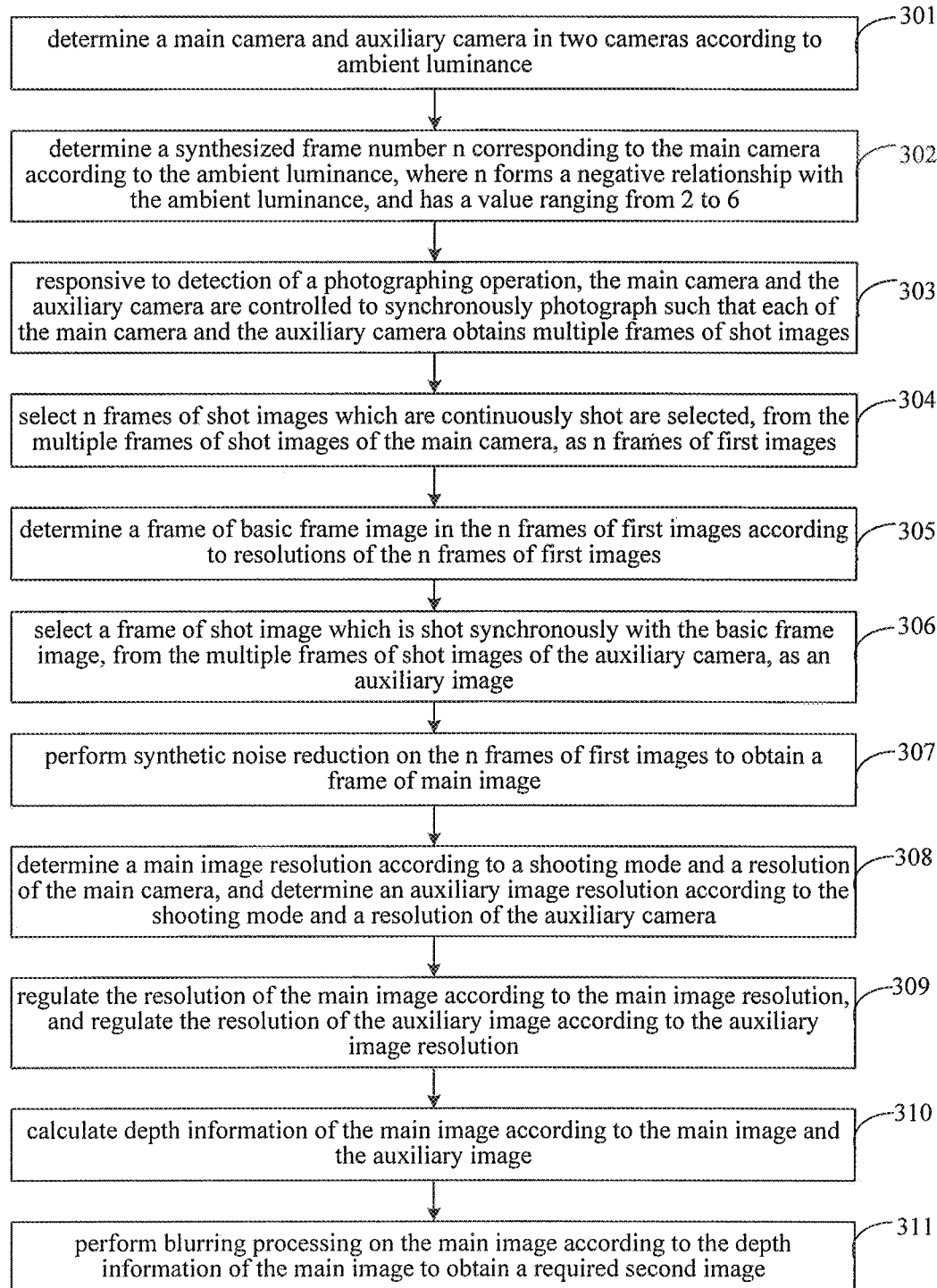
FIG. 3 illustrates a flowchart of another double-camera-based imaging method according to an embodiment of the disclosure.

In order to clearly describe the previous embodiment, an embodiment provides another method for image processing. FIG. 3 illustrates a flowchart of another method for image processing according to an embodiment of the disclosure.

As illustrated in FIG. 3, the method for image processing may include the following actions.

In 301, a main camera and auxiliary camera in double cameras are determined according to ambient luminance.

Specifically, as a possible implementation form, an independent photometric device may be adopted to measure the ambient luminance.

As another possible implementation form, ISO values automatically regulated by a first camera and a second camera may be read and the ambient luminance is determined according to the read ISO values. In general, the first camera and the second camera should adopt the same ISO value, so that the corresponding ambient luminance may be determined by adopting the ISO value. However, if the read ISO value of the first camera and ISO value of the second camera are different, the corresponding ambient luminance may be determined according to an average value of the two.

It is to be noted that an ISO value is configured to indicate ISO of a camera. Common ISO values include 50, 100, 200, 400, 1,000 and the like. A camera may automatically an ISO value according to ambient luminance. Therefore, in the embodiment, the ambient luminance may be reversely calculated according to the ISO values. In general, under a sufficient light condition, the ISO value is 50 or 100, and under an insufficient light condition, the ISO value may be 400 or higher.

The double cameras include the first camera and the second camera. A resolution of the first camera is higher than that of the second camera and ISO of the second camera is higher than that of the first camera. For example, the first camera may be a 16 MP camera, and the second camera may be an 8 MP camera.

Specifically, if the ambient luminance is higher than threshold luminance, the first camera is determined as the main camera, and the second camera is determined as the auxiliary camera. If the ambient luminance is not higher than the threshold luminance, the second camera is determined as the main camera, and the first camera is determined as the auxiliary camera.

This is because, when the high-resolution camera is adopted for photographing as the main camera in case of insufficient light when the ambient luminance is not higher than the threshold luminance, more noise may be produced to cause a poor imaging effect. Therefore, in case of sufficient light, the high-ISO camera may be adopted for photographing as the main camera to reduce noise in the image and improve the imaging effect.

On the contrary, when there is sufficient light when the ambient luminance is higher than the threshold luminance, the resolution of the high-resolution camera is relatively high, a relatively sharp image may be formed with less noise, so that the high-resolution camera may be adopted for photographing as the main camera, and the high-ISO camera is adopted to calculate relatively accurate depth information as the auxiliary camera. Therefore, the imaging effect is improved.

In 302, a synthesized frame number n corresponding to the main camera is determined according to the ambient luminance, wherein n forms a negative relationship with the ambient luminance, and has a value ranging from 2 to 6.

It can be understood that, if the ambient luminance is higher and light is more sufficient, an imaging effect of a camera is better. Then, when the camera is adopted for photographing, there is less noise in a shot image and a requirement on noise reduction accuracy is lower. Therefore, during synthetic noise reduction, a relatively small number of frames of shot images may be adopted. On the contrary, if the ambient luminance is lower, the imaging effect of the camera is poorer. Then, when the camera is adopted for photographing, there is more noise in the shot image, that is, there are more noise points in the shot image, and the requirement on the noise reduction accuracy is higher. Therefore, during synthetic noise reduction, a relatively large number of frames of shot images may be adopted.

Therefore, in the embodiment, during a practical application, the synthesized frame number n corresponding to the main camera may be determined according to the ambient luminance of the mobile terminal.

In 303, responsive to detection of a photographing operation, the main camera and the auxiliary camera are controlled to synchronously photograph such that each of the main camera and the auxiliary camera obtains multiple frames of shot images.

Specifically, a user may trigger a photographing button to enable the main camera and the auxiliary camera to synchronously photograph such that each of the main camera and the auxiliary camera obtains multiple frames of shot images.

As a possible implementation mode, only a picture acquired by the main camera may be previewed, and the user, when viewing a satisfactory preview image, clicks the photographing button, thereby controlling the main camera and the auxiliary camera to synchronously photograph to obtain multiple frames of shot images respectively.

In 304, n frames of shot images which are continuously shot are selected from the multiple frames of shot images of the main camera as n frames of first images.

Specifically, after the multiple frames of shot images shot by the main camera are determined, the n frames of shot images which are continuously shot may be selected from the multiple frames of shot images of the main camera as the n frames of first images. For example, n frames of shot images which are continuously shot may be randomly selected as the n frames of first images, or, n frames of shot images of which an average resolution is highest and which are continuously shot may be selected as the n frames of first images. There are no limits made thereto.

In 305, a frame of basic frame image in the n frames of first images is determined according to resolutions of the n frames of first images.

Specifically, for improving an imaging effect, the shot image with the highest resolution in the n frames of first images may be determined as the basic frame image.

In 306, a frame of shot image which is shot synchronously with the basic frame image is selected from the multiple frames of shot images of the auxiliary camera as an auxiliary image.

Specifically, after the shot image with the highest resolution is selected as the basic frame image, the frame of shot image which is shot synchronously with the basic frame image may be selected from the multiple frames of shot images of the auxiliary camera as the auxiliary image. Since the auxiliary image shot by the auxiliary camera and the high-resolution basic frame image shot by the main camera are synchronously shot, when a field depth is calculated under assistance of the corresponding auxiliary image, depth information calculation accuracy may be improved.

In 307, synthetic noise reduction is performed on the n frames of first images to obtain a frame of main image.

In 308, a main image resolution is determined according to a shooting mode and a resolution of the main camera, and an auxiliary image resolution is determined according to the shooting mode and a resolution of the auxiliary camera.

Specifically, the shooting mode may include a full-length mode and a half-length mode. The full-length mode is applied to a scenario where a full-length portrait is required to be shot during portrait shooting. When the user selects the full-length mode, the user may usually locate the whole portrait in a finder frame during view finding.

The half-length mode is applied to a scenario where a half-length portrait is required to be shot during portrait shooting. The half-length portrait is part of a portrait. For example, when the half-length portrait includes the head and the upper torso part, if the user selects the half-length mode, the user may usually only locate the upper part of the portrait in the finder frame during view finding.

As a possible implementation mode, a control may be provided in a shooting preview interface of the mobile terminal to enable the user to select the shooting mode through the control.

If the shooting mode is the full-length mode, a multiplication operation is performed on the resolution of the main camera and a regulation coefficient corresponding to the full-length mode according to the resolution of the determined main camera to obtain the main image resolution; and the multiplication operation is performed on the resolution of the auxiliary camera and the regulation coefficient corresponding to the full-length mode according to the resolution of the determined auxiliary camera to obtain the auxiliary image resolution.

The regulation coefficient mentioned herein is configured to indicate a proportional relationship between a regulated resolution and an unregulated resolution in an image resolution regulation process. Here, a value range of the regulation coefficient is greater than 1 and 0 to 1. Specifically, if the regulated resolution is higher than the unregulated resolution, a value of the regulation coefficient is greater than 1, and if the regulated resolution is lower than the unregulated resolution, the value of the regulation coefficient is 0 to 1.

If the shooting mode is the half-length mode, the multiplication operation is performed on the resolution of the main camera and a regulation coefficient corresponding to the half-length mode according to the resolution of the determined main camera to obtain the main image resolution; and the multiplication operation is performed on the resolution of the auxiliary camera and the regulation coefficient corresponding to the half-length mode according to the resolution of the determined auxiliary camera.

It is to be noted that the regulation coefficient corresponding to the full-length mode is higher than the regulation coefficient corresponding to the half-length mode.

In 309, the resolution of the main image is regulated according to the main image resolution, and the resolution of the auxiliary image is regulated according to the auxiliary image resolution.

Specifically, when the regulation coefficient corresponding to the shooting mode is a positive number less than or equal to 1, a target region consistent with the main image resolution in the main image is cropped to obtain the main image subjected to resolution regulation, and a target region consistent with the auxiliary image resolution in the auxiliary image is cropped to obtain the auxiliary image subjected to resolution regulation.

In a possible application scenario, the main camera is a wide-angle camera and the auxiliary camera is a telephoto camera. Correspondingly, the target regions may be central regions of the images. This is because there exists peripheral distortion for the wide-angle camera to result in a poor imaging effect. For obtaining a relatively good formed image and ensuring the imaging effect, the first shot image shot by the wide-angle camera is cropped, the central region of the image is reserved and a peripheral distorted region is removed to improve the imaging effect of the wide-angle camera.

The specific set target region range may specifically be set by those skilled in the art according to an imaging parameter, for example, a resolution, of the wide-angle camera, shooting environment and the like during a practical application.

As a possible implementation mode, the set target region range may be set according to the resolution of the wide-angle camera, a peripheral distortion degree and the like. An optical design of the wide-angle camera makes a peripheral distortion under a large-field-of-view condition inevitable. Specifically, paraxial imaging meets an imaging relationship of $y'=f \times \tan(T)$, where $y'$ is a radial dimension of the sensor, $T$ is the field of view and $f$ is a focal length. The radial dimension $y'$ of the sensor is constant, so that $T$ is undoubtedly increased when $f$ is reduced, namely under the condition of a short focus end, and then a wide angle may be achieved. However, an imaging rule gradually gets inconsistent with a paraxial condition under the large-field-of-view condition and the imaging relationship meeting $y'=f \times \tan(T)$ gradually turns to be close to a $y=f \times T$ rule, so as to result in negative distortion in a large field of view. Such a distortion is highlighted more on a periphery of the image. On the basis of the above distortion principle, it can be seen that a peripheral distortion degree is associated with a size of the field of view to a certain extent. Therefore, the set target region range may be determined according to at least one of the field of view and resolution of the wide-angle camera.

In 310, depth information of the main image is calculated according to the main image and the auxiliary image.

In 311, blurring processing is performed on the main image according to the depth information of the main image to obtain a required second image.

According to the method for image processing of the embodiment, after the n frames of first images shot by the main camera are acquired and the auxiliary image shot by the auxiliary camera is acquired, synthetic noise reduction is performed on the n frames of first images to obtain the frame of main image, and the depth information of the main image is further calculated according to the main image and the auxiliary image, thereby performing blurring processing on the main image according to the depth information of the main image to obtain the required second image. Synthetic noise reduction is performed on the n frames of first images to obtain the frame of main image, so that noise in the image is reduced, and a resolution of the main image is relatively high. In addition, the auxiliary image shot by the auxiliary camera and the basic frame image shot by the main camera are synchronously shot, so that performing subsequent blurring processing on the high-resolution main image according to the corresponding auxiliary image improves an imaging effect of an imaged photo on one hand and, on the other hand, improves accuracy of the depth information to further achieve a relatively good image processing effect and solve the technical problem of relatively poor effect of the image subjected to blurring processing in the conventional art.

In order to implement the abovementioned embodiments, the disclosure further discloses a device for image processing.

Figure 4:
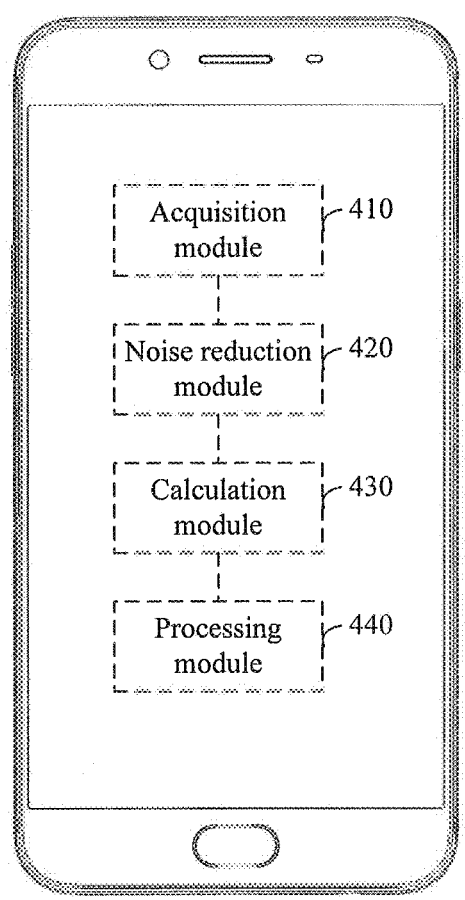
FIG. 4 illustrates a structure diagram of a device for image processing according to an embodiment of the disclosure.

FIG. 4 illustrates a structure diagram of a device for image processing according to an embodiment of the disclosure. The device for image processing may be applied to a mobile terminal.

As shown in FIG. 4, the device for image processing includes: an acquisition module 410, a noise reduction module 420, a calculation module 430 and a processing module 440.

The acquisition module 410 is configured to acquire n frames of first images shot by a main camera and acquire an auxiliary image shot by an auxiliary camera, wherein n is a natural number more than or equal to 2, the n frames of first images include a frame of basic frame image and the auxiliary image shot by the auxiliary camera and the basic frame image shot by the main camera are synchronously shot.

The noise reduction module 420 is configured to perform synthetic noise reduction on the n frames of first images to obtain a frame of main image.

The calculation module 430 is configured to calculate depth information of the main image according to the main image and the auxiliary image.

The processing module 440 is configured to perform blurring processing on the main image according to the depth information of the main image to obtain a required second image.

Figure 5:
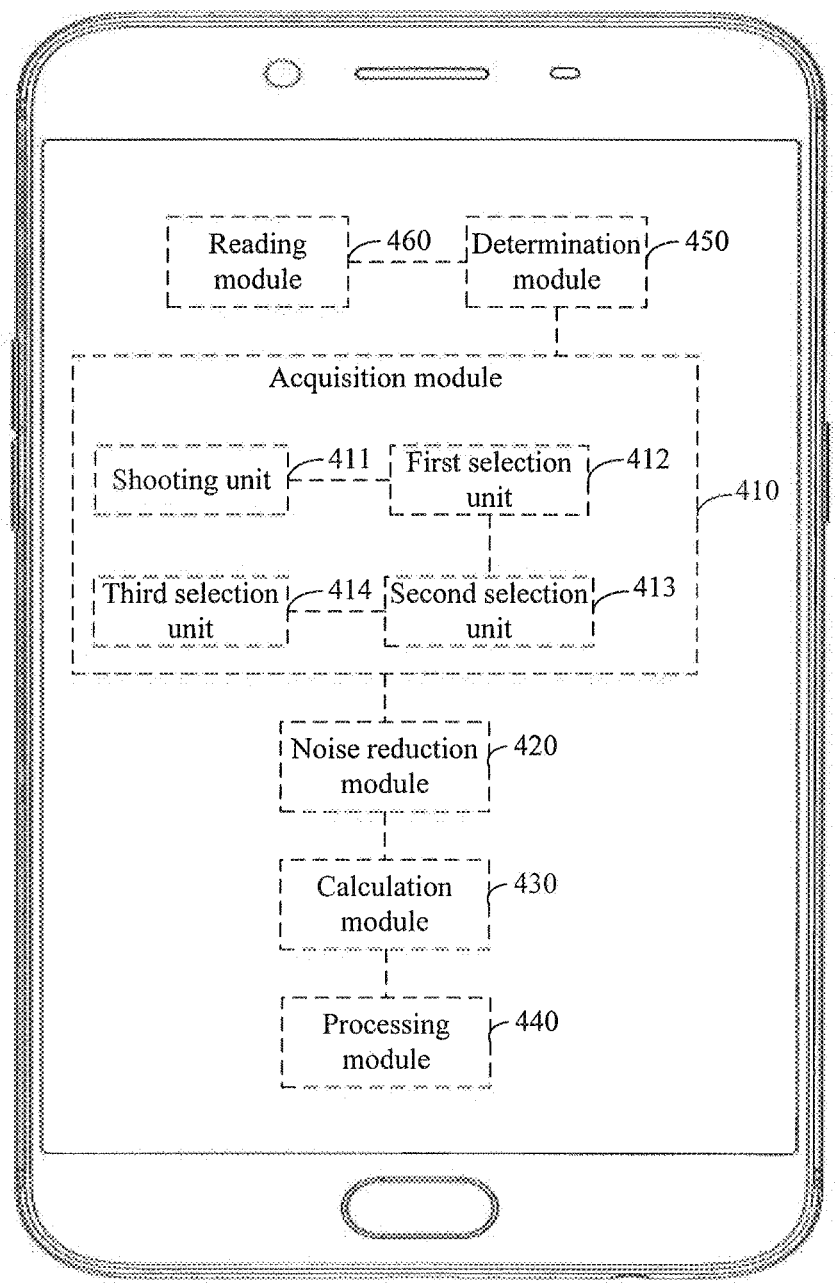
FIG. 5 illustrates a structure diagram of another device for image processing according to an embodiment of the disclosure.

Furthermore, as a possible implementation mode, referring to FIG. 5, on the basis of FIG. 4, the device for image processing may further include: a determination module 450 and a reading module 460.

The determination module 450 is configured to determine the main camera and auxiliary camera in the double cameras according to ambient luminance and determine a synthesized frame number n corresponding to the main camera according to the ambient luminance, wherein n forms a negative relationship with the ambient luminance, and has a value ranging from 2 to 6.

The reading module 460 is configured to read ISO values of the double cameras and determine the ambient luminance according to the read ISO values of the double cameras.

In the embodiment, the determination module 450 is specifically configured to read ISO values of the main camera and the auxiliary camera and determine the ambient luminance according to the read ISO values of the main camera and the auxiliary camera.

As a possible implementation mode, the acquisition module 410 includes: a shooting unit 411, a first selection unit 412, a second selection unit 413 and a third selection unit 414.

The shooting unit 411 is configured to, responsive to detection of a photographing operation, control the main camera and the auxiliary camera to synchronously photograph such that each of the main camera and auxiliary camera obtains multiple frames of shot images.

The first selection unit 412 is configured to select n frames of shot images which are continuously shot from the multiple frames of shot images of the main camera as the n frames of first images and determine the frame of basic frame image in the n frames of first images according to resolutions of the n frames of first images.

The second selection unit 413 is configured to select a frame of shot image which is shot synchronously with the basic frame image from the multiple frames of shot images of the auxiliary camera as the auxiliary image.

The third selection unit 414 is configured to select the frame of shot image which is shot synchronously with the basic frame image from the multiple frames of shot images of the auxiliary camera as the auxiliary image.

It is to be noted that explanations and descriptions about the embodiment of the method for image processing are also applied to the device for image processing of the embodiment and will not be elaborated herein.

According to the device for image processing of the embodiment, after the n frames of first images shot by the main camera are acquired and the auxiliary image shot by the auxiliary camera is acquired, synthetic noise reduction is performed on the n frames of first images to obtain the frame of main image, and the depth information of the main image is further calculated according to the main image and the auxiliary image, thereby performing blurring processing on the main image according to the depth information of the main image to obtain the required second image. Synthetic noise reduction is performed on the n frames of first images to obtain the frame of main image, so that noise in the image is reduced, and a resolution of the main image is relatively high. In addition, the auxiliary image shot by the auxiliary camera and the basic frame image shot by the main camera are synchronously shot, so that performing subsequent blurring processing on the high-resolution main image according to the corresponding auxiliary image improves an imaging effect of an imaged photo on one hand and, on the other hand, improves accuracy of the depth information to further achieve a relatively good image processing effect and solve the technical problem of relatively poor effect of the image subjected to blurring processing in the conventional art.

Figure 6:
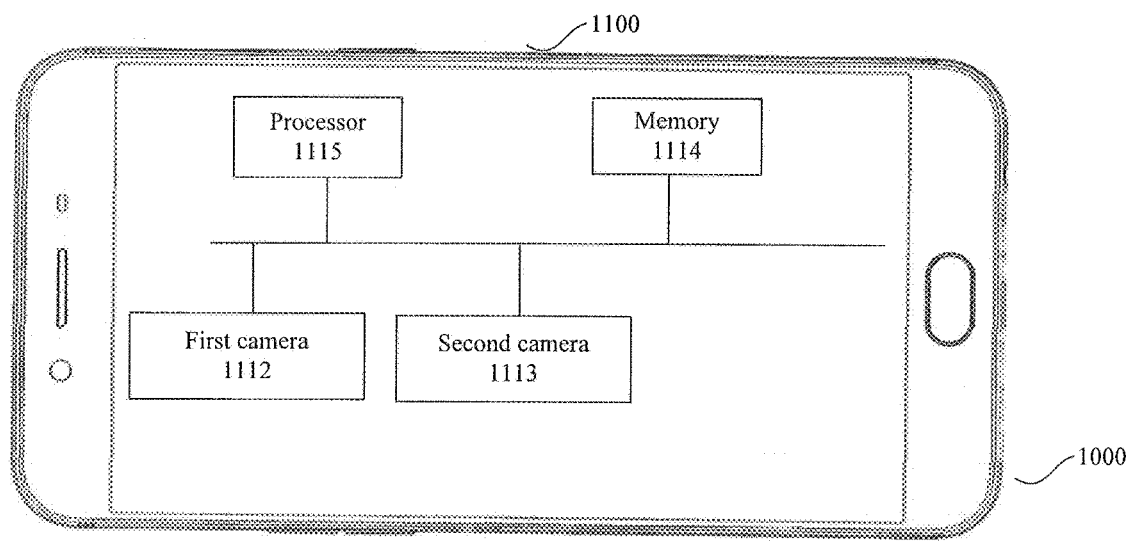
FIG. 6 illustrates a structure diagram of terminal equipment according to another embodiment of the disclosure.

In order to implement the abovementioned embodiments, the disclosure further discloses a mobile terminal. FIG. 6 is a structure diagram of terminal equipment according to another embodiment of the disclosure. As shown in FIG. 6, the terminal equipment 1000 includes: a shell 1100, and a main camera 1112, auxiliary camera 1113, memory 1114 and processor 1115 which are located in the shell 1100.

Where an executable program code is stored in the memory 1114; and the processor 1115 reads the executable program code stored in the memory 1114 to run a program corresponding to the executable program code to implement the method for image processing of the abovementioned method embodiment.

In order to implement the abovementioned embodiments, the disclosure further discloses a computer-readable storage medium, on which a computer program is stored, wherein the program is executed by a processor of a mobile terminal to implement the method for image processing in the abovementioned embodiments.

Figure 7:
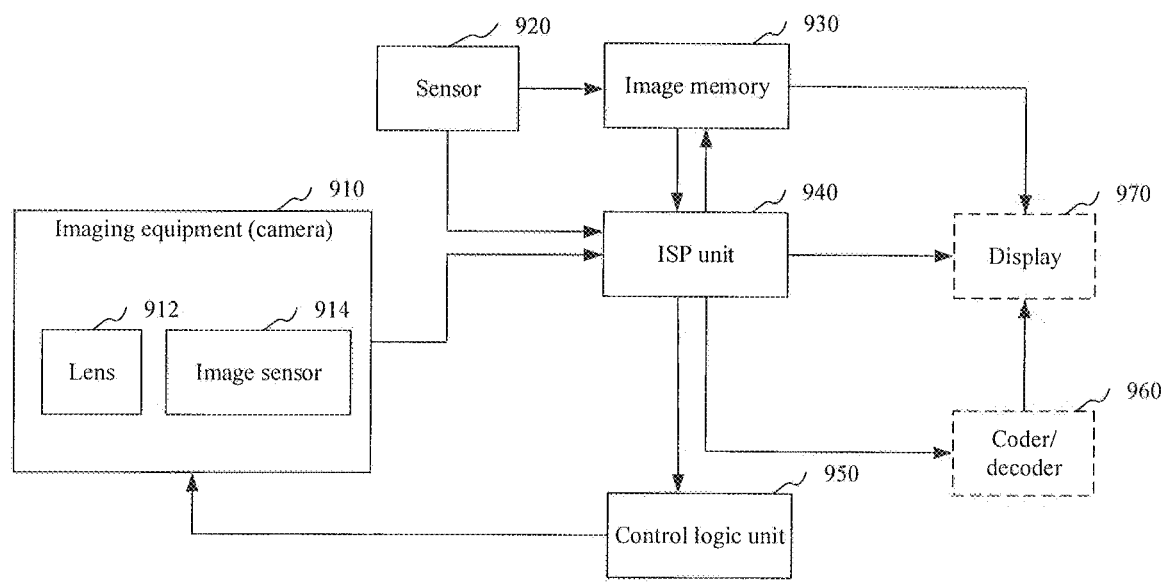
FIG. 7 illustrates a schematic diagram of an image processing circuit according to an embodiment.

The mobile terminal further includes an image processing circuit, and the image processing circuit may be implemented by use of a hardware and/or software component, and may include various processing units defining an Image Signal Processing (ISP) pipeline. FIG. 7 illustrates a schematic diagram of an image processing circuit according to an embodiment. As illustrated in FIG. 7, each aspect of an image processing technology related to the embodiments of the disclosure is shown only, for convenient description.

As illustrated in FIG. 7, the image processing circuit includes an ISP unit 940 and a control logic unit 950. Image data captured by imaging equipment 910 is processed by the ISP unit 940 at first, and the ISP unit 940 analyzes the image data to capture image statistical information configurable to determine one or more control parameters of the ISP unit and/or the imaging equipment 910. The imaging equipment 910 may specifically include two cameras, and each camera may include one or more lenses 912 and an image sensor 914. The image sensor 914 may include a color filter array (for example, a Bayer filter), and the image sensor 914 may acquire light intensity and wavelength information captured by each imaging pixel of the image sensor 914 and provide a set of original image data processible for the ISP unit 940. A sensor 920 may provide the original image data for the ISP unit 940 on the basis of an interface type of the sensor 920. An interface of the sensor 920 may adopt a Standard Mobile Imaging Architecture (SMIA) interface, another serial or parallel camera interface or a combination of the interfaces.

The ISP unit 940 processes the original image data pixel by pixel according to multiple formats. For example, each image pixel may have a bit depth of 8, 10, 12 or 14 bits. The ISP unit 940 may execute one or more image processing operations on the original image data and collect the image statistical information about the image data, wherein the image processing operations may be executed according to the same or different bit depth accuracy.

The ISP unit 940 may further receive the pixel data from an image memory 930. For example, the interface of the sensor 920 sends the original pixel data to the image memory 930, and the original pixel data in the image memory 930 is provided for the ISP unit 940 for processing. The image memory 930 may be a part of a memory device, storage equipment or an independent dedicated memory in electronic equipment, and may include a Direct Memory Access (DMA) feature.

When receiving the original image data from the interface of the sensor 920 or from the image memory 930, the ISP unit 940 may execute the one or more image processing operations, for example, time-domain filtering. The processed image data may be sent to the image memory 930 for other processing before displaying. The ISP unit 940 receives the processed data from the image memory 930 and performs image data processing in an original domain and color spaces Red, Green and Blue (RGB) and YCbCr on the processed data. The processed image data may be output to a display 970 for a user to view and/or for further processing by a Graphics Processing Unit (GPU). In addition, output of the ISP unit 940 may further be sent to the image memory 930, and the display 970 may read the image data from the image memory 930. In an embodiment, the image memory 930 may be configured to implement one or more frame buffers. Moreover, the output of the ISP unit 940 may be sent to a coder/decoder 960 to code/decode the image data. The coded image data may be stored, and is decompressed before being displayed on the display 970. The coder/decoder 960 may be implemented by a Central Processing Unit (CPU) or a GPU or a coprocessor.

The statistical information determined by the ISP unit 940 may be sent to the control logic unit 950. For example, the statistical information may include statistical information of automatic exposure, automatic white balance, automatic focusing, flashing detection, black level compensation, shading correction of the lens 912 and the like of the image sensor 914. The control logic unit 950 may include a processor and/or microcontroller executing one or more routines (for example, firmware), and the one or more routines may determine the control parameter of the imaging equipment 910 and the control parameter of the ISP unit according to the received statistical data. For example, the control parameter may include a control parameter (for example, integral time for gain and exposure control) for the sensor 920, a camera flashing control parameter, a control parameter (for example, a focal length for focusing or zooming) for the lens 912 or a combination of these parameters. The control parameter for the ISP unit may include a gain level and color correction matrix configured for automatic white balance and color regulation (for example, during RGB processing) and a shading correction parameter for the lens 912.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the disclosure. In the specification, these terms are not always schematically expressed for the same embodiment or example. Moreover, the specific described features, structures, materials or characteristics may be combined in a proper manner in any one or more embodiments or examples. In addition, those skilled in the art may integrate and combine different embodiments or examples described in the specification and features of different embodiments or examples without conflicts.

In addition, terms "first" and "second" are only adopted for description and should not be understood to indicate or imply relative importance or implicitly indicate the number of indicated technical features. Therefore, a feature defined by "first" and "second" may explicitly or implicitly indicate inclusion of at least one such feature. In the descriptions of the disclosure, "multiple" means at least two, for example, two and three, unless otherwise limited definitely and specifically.

Any process or method in the flowcharts or described herein in another manner may be understood to represent a module, segment or part including codes of one or more executable instructions configured to realize specific logic functions or steps of the process and, moreover, the scope of the preferred implementation mode of the disclosure includes other implementation, not in a sequence shown or discussed herein, including execution of the functions basically simultaneously or in an opposite sequence according to the involved functions. This should be understood by those skilled in the art of the embodiments of the disclosure.

Logics and/or steps represented in the flowcharts or described herein in another manner, for example, may be considered as a fixed sequence list of executable instructions configured to realize the logic functions and may specifically implemented in any computer-readable medium for an instruction execution system, device or equipment (for example, a computer-based system, a system including a processor or another system capable of reading instructions from the instruction execution system, device or equipment and executing the instructions) to use or for use in combination with the instruction execution system, device or equipment. For the specification, "computer-readable medium" may be any device capable of including, storing, communicating with, propagating or transmitting a program for the instruction execution system, device or equipment to use or for use in combination with the instruction execution system, device or equipment. A more specific example (non-exhaustive list) of the computer-readable medium includes: an electric connection portion (electronic device) with one or more wires, a portable computer disk (magnetic device), a Random Access Memory (RAM), a Read-Only Memory (ROM), an Erasable Programmable ROM (EPROM) (or flash memory), an optical fiber device and a portable Compact Disc Read-Only Memory (CD-ROM). In addition, the computer-readable medium may even be paper or another medium on which the program may be printed because, for example, the paper or the other medium may be optically scanned then edited, explained or, when necessary, processed in another proper manner to obtain the program in an electronic manner for storage in the computer memory.

It should be understood that each part of the disclosure may be implemented by hardware, software, firmware or a combination thereof. In the abovementioned implementation modes, multiple steps or methods may be implemented by software or firmware stored in a memory and executed by a proper instruction execution system. For example, in case of implementation with the hardware, like another implementation mode, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art should understand that all or part of the steps in the method of the abovementioned embodiment may be completed through related hardware instructed by a program, the program may be stored in a computer-readable storage medium, and when the program is executed, one or combination of the steps of the method embodiment is included.

In addition, each functional unit in each embodiment of the disclosure may be integrated into a processing module, each unit may also physically exist independently, and two or more than two units may also be integrated into a module. The integrated module may be implemented in a hardware form and may also be implemented in form of software functional module. When being implemented in form of software functional module and sold or used as an independent product, the integrated module may be stored in a computer-readable storage medium.

The storage medium may be a read-only memory, a magnetic disk, an optical disk or the like. The embodiments of the disclosure have been shown or described above. However, it can be understood that the abovementioned embodiments are exemplary and should not be understood as limits to the disclosure and those of ordinary skill in the art may make variations, modifications, replacements, transformations to the abovementioned embodiments within the scope of the disclosure.

The invention claimed is:

1. A method for image processing, comprising:
   determining a main camera and an auxiliary camera from two cameras according to ambient luminance, wherein the two cameras comprises a first camera and a second camera, a resolution of the first camera is higher than a resolution of the second camera, and an International Standardization Organization (ISO) value of the first camera is lower than an ISO value of the second camera, and wherein the first camera is determined as the main camera and the second camera is determined as the auxiliary camera, when the ambient luminance is higher than threshold luminance; and the second camera is determined as the main camera and the first camera is determined as the auxiliary camera, when the ambient luminance is not higher than the threshold luminance;
   acquiring n frames of first images by a main camera, and acquiring an auxiliary image by an auxiliary camera, wherein n is a natural number more than or equal to 2, then frames of first images comprise a frame of basic frame image and the auxiliary image shot by the auxiliary camera and the basic frame image shot by the main camera are synchronously shot; wherein, the frame of basic frame image is selected as a frame image with a highest pixel resolution from the n frames of first images based on a comparison between pixel resolutions of the n frames of first images;
   performing synthetic noise reduction on the n frames of first images to obtain a frame of main image;
   calculating depth information of the main image according to the main image and the auxiliary image; and
   performing blurring processing on the main image according to the depth information of the main image to obtain a required second image.

2. The method for image processing of claim 1, wherein acquiring the n frames of first images shot by the main camera comprises:
   responsive to detection of a photographing operation, controlling the main camera and the auxiliary camera to synchronously photograph such that each of the main camera and the auxiliary camera obtains a plurality of frames of shot images;
   selecting, from the plurality of frames of shot images, n frames of shot images which are continuously shot, as the n frames of first images.

3. The method for image processing of claim 1, after determining the main camera and auxiliary camera in the two cameras according to the ambient luminance, further comprising:
   determining a synthesized frame number n corresponding to the main camera according to the ambient luminance, wherein n forms a negative relationship with the ambient luminance, and has a value ranging from 2 to 6, and the number of frames increases when the ambient luminance decreases.

4. The method for image processing of claim 1, before determining the main camera and auxiliary camera in the double cameras according to the ambient luminance, further comprising:
   reading International Standardization Organization (ISO) values of the two cameras; and
   determining the ambient luminance according to the read ISO values of the two cameras.

5. The method for image processing of claim 1, wherein a resolution of the auxiliary camera is lower than a resolution of the main camera, and merely the auxiliary camera is adopted for focusing.

6. The method for image processing of claim 1, wherein when a close shot is taken, a wide-angle camera is used as the main camera and a telephoto camera is used as the auxiliary camera; when a long shot is taken, the telephoto camera is used as the main camera and the wide-angel camera is used as the auxiliary camera.

7. The method for image processing of claim 1, wherein after performing synthetic noise reduction on the n frames of first images to obtain a frame of main image, and before calculating depth information of the main image according to the main image and the auxiliary image, the method further comprises:
   determining a main image resolution according to a shooting mode and a resolution of the main camera, and determining an auxiliary image resolution according to the shooting mode and a resolution of the auxiliary camera; and
   regulating the resolution of the main camera according to the main image resolution, and regulating the resolution of the auxiliary image according to the auxiliary image resolution.

8. A device for image processing, comprising a processor and a memory storing instructions; the instructions, when executed by the processor, causing the processor to perform a method for image processing; the method comprising:
   determining a main camera and an auxiliary camera from two cameras according to ambient luminance, wherein the two cameras comprises a first camera and a second camera, a resolution of the first camera is higher than a resolution of the second camera, and an International Standardization Organization (ISO) value of the first camera is lower than an ISO value of the second camera, and wherein the first camera is determined as the main camera and the second camera is determined as the auxiliary camera, when the ambient luminance is higher than threshold luminance; and the second camera is determined as the main camera and the first camera is determined as the auxiliary camera, when the ambient luminance is not higher than the threshold luminance;
   acquiring n frames of first images by a main camera, and acquiring an auxiliary image by an auxiliary camera, wherein n is a natural number more than or equal to 2, the n frames of first images comprise a frame of basic frame image and the auxiliary image shot by the auxiliary camera and the basic frame image shot by the main camera are synchronously shot; wherein, the frame of basic frame image is selected as a frame image with a highest pixel resolution from the n frames of first images based on a comparison between pixel resolutions of the n frames of first images;

performing synthetic noise reduction on the n frames of first images to obtain a frame of main image;

calculating depth information of the main image according to the main image and the auxiliary image; and performing blurring processing on the main image according to the depth information of the main image to obtain a required second image.

9. The device for image processing of claim 8, wherein acquiring the n frames of first images shot by the main camera comprises:

responsive to detection of a photographing operation, controlling the main camera and the auxiliary camera to synchronously photograph such that each of the main camera and the auxiliary camera obtains a plurality of frames of shot images;

selecting, from the plurality of frames of shot images, n frames of shot images which are continuously shot, as the n frames of first images.

10. The device for image processing of claim 8, wherein after determining the main camera and auxiliary camera in the two cameras according to the ambient luminance, the method further comprises:

determining a synthesized frame number n corresponding to the main camera according to the ambient luminance, wherein n forms a negative relationship with the ambient luminance, and has a value ranging from 2 to 6, and the number of frames increases when the ambient luminance decreases.

11. The device for image processing of claim 8, wherein before determining the main camera and auxiliary camera in the double cameras according to the ambient luminance, the method further comprises:

reading International Standardization Organization (ISO) values of the two cameras; and determining the ambient luminance according to the read ISO values of the two cameras.

12. The device for image processing of claim 8, wherein a resolution of the auxiliary camera is lower than a resolution of the main camera, and merely the auxiliary camera is adopted for focusing.

13. The device for image processing of claim 8, wherein when a close shot is taken, a wide-angle camera is used as the main camera and a telephoto camera is used as the auxiliary camera; when a long shot is taken, the telephoto camera is used as the main camera and the wide-angel camera is used as the auxiliary camera.

14. The device for image processing of claim 8, wherein after performing synthetic noise reduction on the n frames of first images to obtain a frame of main image, and before calculating depth information of the main image according to the main image and the auxiliary image, the method further comprises:

determining a main image resolution according to a shooting mode and a resolution of the main camera, and determining an auxiliary image resolution according to the shooting mode and a resolution of the auxiliary camera; and regulating the resolution of the main camera according to the main image resolution, and regulating the resolution of the auxiliary image according to the auxiliary image resolution.

15. A non-transitory computer-readable storage medium, on which a computer program is stored, wherein the computer program is executed by a computer to implement a method for image processing; the method comprising:

determining a main camera and an auxiliary camera from two cameras according to ambient luminance, wherein the two cameras comprises a first camera and a second camera, a resolution of the first camera is higher than a resolution of the second camera, and an International Standardization Organization (ISO) value of the first camera is lower than an ISO value of the second camera, and wherein the first camera is determined as the main camera and the second camera is determined as the auxiliary camera, when the ambient luminance is higher than threshold luminance; and the second camera is determined as the main camera and the first camera is determined as the auxiliary camera, when the ambient luminance is not higher than the threshold luminance;

acquiring n frames of first images by a main camera, and acquiring an auxiliary image by an auxiliary camera, wherein n is a natural number more than or equal to 2, the n frames of first images comprise a frame of basic frame image and the auxiliary image shot by the auxiliary camera and the basic frame image shot by the main camera are synchronously shot; wherein, the frame of basic frame image is selected as a frame image with a highest pixel resolution from the n frames of first images based on a comparison between pixel resolutions of the n frames of first images;

performing synthetic noise reduction on the n frames of first images to obtain a frame of main image;

calculating depth information of the main image according to the main image and the auxiliary image; and performing blurring processing on the main image according to the depth information of the main image to obtain a required second image.

16. The non-transitory computer-readable storage medium of claim 15, wherein acquiring then frames of first images shot by the main camera comprises:

responsive to detection of a photographing operation, controlling the main camera and the auxiliary camera to synchronously photograph such that each of the main camera and the auxiliary camera obtains a plurality of frames of shot images;

selecting, from the plurality of frames of shot images, n frames of shot images which are continuously shot, as the n frames of first images.

* * * * *

UNITED STATES PATENT AND TRADEMARK OFFICE
CERTIFICATE OF CORRECTION

PATENT NO. : 10,825,146 B2
APPLICATION NO. : 16/163370
DATED : November 3, 2020
INVENTOR(S) : Dan Ouyang and Guohui Tan Page 1 of 1

It is certified that error appears in the above-identified patent and that said Letters Patent is hereby corrected as shown below:

On the Title Page

Item (71) Applicant:
"GUANGDONG OPPO MOBILE TELECOMMUNICATIONS CORP., LTD., Guangdong (CN)"
Is changed to:
--GUANGDONG OPPO MOBILE TELECOMMUNICATIONS CORP., LTD., Dongguan, Guangdong (CN)--

Item (73) Assignee:
"GUANGDONG OPPO MOBILE TELECOMMUNICATIONS CORP., LTD, Guangdong (CN)"
Is changed to:
--GUANGDONG OPPO MOBILE TELECOMMUNICATIONS CORP., LTD., Dongguan, Guangdong (CN)--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*